(12) United States Patent  
Raasch et al.

(10) Patent No.: US 8,485,313 B2
(45) Date of Patent: Jul. 16, 2013

(54) MUFFLER AND ENGINE SYSTEM

(75) Inventors: Jason J. Raasch, Cedarburg, WI (US); Gary J. Gracyalny, Elm Grove, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 354 days.

(21) Appl. No.: 12/818,388

(22) Filed: Jun. 18, 2010

(65) Prior Publication Data

US 2011/0308236 A1    Dec. 22, 2011

(51) Int. Cl.
*F01N 1/14*    (2006.01)
*F01N 3/02*    (2006.01)

(52) U.S. Cl.
USPC ............................. 181/262; 60/289; 60/320

(58) Field of Classification Search
USPC .... 60/289, 298, 320, 322, 324, 293; 181/262, 181/272
See application file for complete search history.

(56) References Cited

U.S. PATENT DOCUMENTS

| | | |
|---|---|---|
| 1,745,492 A | 2/1930 | Kelch et al. |
| 1,847,506 A | 3/1932 | White |
| 2,397,208 A | 3/1946 | Saco, Jr. et al. |
| 2,947,600 A | 8/1960 | Clayton |
| 3,082,597 A | 3/1963 | Hamblin |
| 3,209,532 A | 10/1965 | Morris et al. |
| 3,280,903 A | 10/1966 | Stoddard, Jr. |
| 3,306,035 A | 2/1967 | Morrell |
| 3,390,520 A | 7/1968 | Mattson |
| 3,751,915 A | 8/1973 | Ranft et al. |
| 3,768,366 A | 10/1973 | Grabb et al. |
| 3,852,959 A | 12/1974 | Weisgerber |
| 3,924,408 A | 12/1975 | Beiswenger et al. |
| 3,934,413 A | 1/1976 | Beiswenger et al. |
| 3,942,321 A | 3/1976 | Eckhardt et al. |
| 3,948,236 A | 4/1976 | Nartowski et al. |
| 3,982,397 A | 9/1976 | Laurent |
| 3,983,697 A | 10/1976 | Goto et al. |
| 4,038,819 A | 8/1977 | Yoshikawa et al. |
| 4,064,693 A | 12/1977 | Shibata |
| 4,084,373 A | 4/1978 | Hashimoto et al. |
| 4,087,964 A | 5/1978 | Miyagi |
| 4,087,965 A | 5/1978 | Thornburgh |
| 4,098,078 A | 7/1978 | Laurent |
| 4,117,640 A | 10/1978 | Vanderstar |
| 4,154,058 A | 5/1979 | Mase et al. |
| 4,162,613 A | 7/1979 | Tamura et al. |
| 4,165,611 A | 8/1979 | Ishikawa |
| 4,185,604 A | 1/1980 | Hagaishi et al. |
| 4,189,915 A | 2/1980 | Miura |
| 4,257,227 A | 3/1981 | Sato et al. |
| 4,263,783 A | 4/1981 | Miura et al. |
| 4,276,745 A | 7/1981 | Takada et al. |
| 4,315,559 A * | 2/1982 | Casey ........................... 181/265 |

(Continued)

*Primary Examiner* — Kenneth Bomberg
*Assistant Examiner* — Dapinder Singh
(74) *Attorney, Agent, or Firm* — Foley & Lardner LLP

(57) ABSTRACT

A muffler for a combustion engine includes walls forming a chamber, a first inlet, a first outlet, and a conduit. The first inlet is designed to receive exhaust gases from an exhaust duct of the engine. The exhaust gases pass through the chamber when moving from the first inlet to the first outlet. The exhaust gases then exit the muffler through the first outlet. The conduit extends between a second inlet and a second outlet. The second inlet is configured to receive fresh air entering the muffler. The fresh air then exits the conduit and is introduced into the exhaust gases through the second outlet.

20 Claims, 18 Drawing Sheets

U.S. PATENT DOCUMENTS

| | | | |
|---|---|---|---|
| 4,376,427 A | 3/1983 | Mizuno | |
| 4,387,565 A | 6/1983 | Otani et al. | |
| 4,395,876 A | 8/1983 | Marsee et al. | |
| 4,437,306 A | 3/1984 | Ikenoya et al. | |
| 4,450,932 A * | 5/1984 | Khosropour et al. | 181/211 |
| 4,463,554 A | 8/1984 | Sudbeck et al. | |
| 4,464,896 A | 8/1984 | Kubota | |
| 4,583,363 A | 4/1986 | Urushidani et al. | |
| 5,095,691 A | 3/1992 | Yoshimura | |
| 5,125,620 A | 6/1992 | Young | |
| 5,205,120 A | 4/1993 | Oblander et al. | |
| 5,235,804 A | 8/1993 | Colket, III et al. | |
| 5,345,763 A | 9/1994 | Sato | |
| 5,349,816 A | 9/1994 | Sanbayashi et al. | |
| 5,406,788 A | 4/1995 | Dambach et al. | |
| 5,431,013 A * | 7/1995 | Yamaki et al. | 60/289 |
| 5,459,998 A | 10/1995 | Hosoya et al. | |
| 5,499,502 A | 3/1996 | Haniu et al. | |
| 5,567,393 A | 10/1996 | Muschelknautz et al. | |
| 5,666,804 A | 9/1997 | Sekiya et al. | |
| 5,732,555 A * | 3/1998 | Gracyalny et al. | 60/299 |
| 5,857,327 A * | 1/1999 | Sato et al. | 60/302 |
| 5,902,971 A | 5/1999 | Sato et al. | |
| 5,983,632 A | 11/1999 | Fujita et al. | |
| 6,094,909 A | 8/2000 | Weber et al. | |
| 6,164,066 A * | 12/2000 | Sakaguchi et al. | 60/302 |
| 6,167,699 B1 | 1/2001 | Johnson et al. | |
| 6,216,453 B1 | 4/2001 | Maurer | |
| 6,467,570 B1 * | 10/2002 | Herold | 181/231 |
| 6,789,385 B2 | 9/2004 | Glover | |
| 6,832,665 B2 * | 12/2004 | Crombeen | 181/275 |
| 6,865,881 B2 | 3/2005 | Monro, Jr. | |
| 6,910,550 B2 * | 6/2005 | Schlossarczyk et al. | 181/283 |
| 6,912,845 B2 | 7/2005 | Hirooka | |
| 6,955,043 B2 * | 10/2005 | Schlossarczyk et al. | 60/299 |
| 6,978,605 B2 * | 12/2005 | Chiba et al. | 60/302 |
| 7,024,852 B2 | 4/2006 | Trapp | |
| 7,032,375 B2 | 4/2006 | Tsuzuki et al. | |
| 7,131,262 B2 | 11/2006 | Sealy et al. | |
| 7,162,865 B2 | 1/2007 | Weigand et al. | |
| 7,174,991 B1 * | 2/2007 | Gunnarsson et al. | 181/231 |
| 7,178,330 B2 | 2/2007 | Kouzu et al. | |
| 7,222,483 B2 | 5/2007 | Oi et al. | |
| 7,409,823 B2 | 8/2008 | Price et al. | |
| 7,413,716 B2 * | 8/2008 | Mavinahally et al. | 422/177 |
| 7,448,204 B2 * | 11/2008 | Nishimura et al. | 60/284 |
| 7,482,705 B2 * | 1/2009 | Piercey, III | 290/1 A |
| 7,487,633 B2 * | 2/2009 | Popik et al. | 60/289 |
| 7,578,369 B2 * | 8/2009 | Francisco et al. | 181/213 |
| 7,854,296 B2 * | 12/2010 | Saunders et al. | 181/240 |
| 2002/0162323 A1 | 11/2002 | Detweiler et al. | |
| 2005/0103003 A1* | 5/2005 | Crombeen | 60/319 |
| 2006/0054381 A1 | 3/2006 | Takemoto et al. | |
| 2007/0039313 A1 | 2/2007 | Sealy et al. | |
| 2007/0079604 A1 | 4/2007 | Macaluso | |
| 2007/0240404 A1 | 10/2007 | Pekrul et al. | |
| 2008/0178583 A1 | 7/2008 | Zhang | |
| 2008/0245604 A1* | 10/2008 | Saunders et al. | 181/227 |
| 2008/0282685 A1* | 11/2008 | Wu | 60/299 |
| 2009/0293462 A1* | 12/2009 | Duch et al. | 60/299 |

* cited by examiner

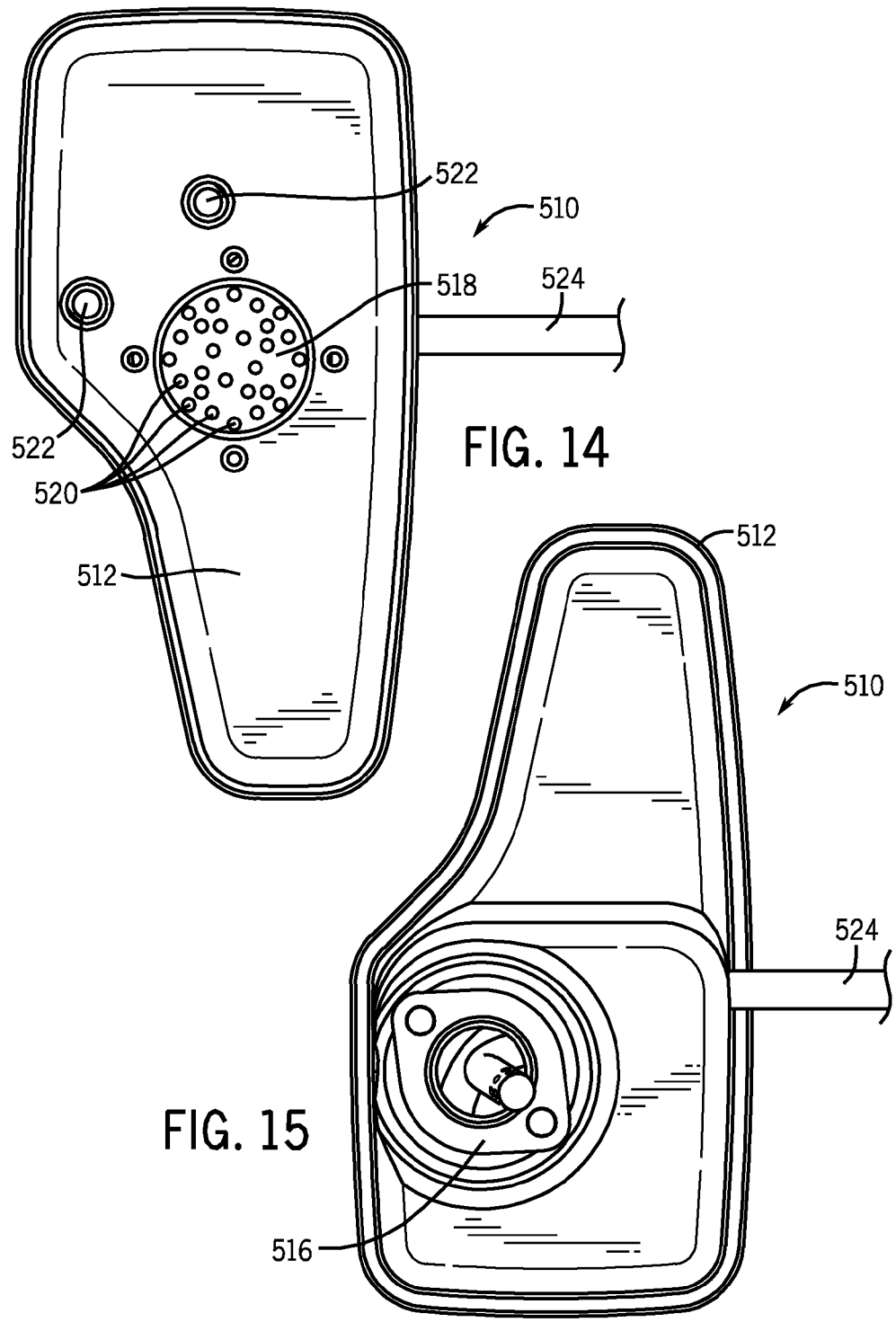

MUFFLER AND ENGINE SYSTEM

BACKGROUND

The present invention relates generally to the field of combustion engines. More specifically the present invention relates to mufflers and secondary air injection systems for combustion engines.

Combustion engines are typically equipped with mufflers to control noise emissions. The muffler on a small engine may be attached directly to the exhaust outlet of the cylinder block or cylinder head, and includes a resonating chamber or chambers designed to dissipate sound. In a typical multiple-chambered, tube-outlet muffler for a small combustion engine, exhaust gases and noise enter the muffler through an inlet conduit attached to the cylinder block. The noise is directed into a resonating chamber. The chamber walls are formed from the muffler housing and may include one or more internal separators or baffles. Exhaust gases and noise pass around or through openings in the separators into other chambers of the muffler, and the noise is dissipated. Exhaust gases exit the muffler through an outlet tube (e.g., exhaust pipe) or a perforate outlet formed from a series of small openings in the muffler housing.

Other than noise emissions, combustion engines typically produce pollutants in their exhaust, which include hydrocarbon emissions, nitric oxide, carbon dioxide, carbon monoxide, and/or other pollutants. The pollutants are formed from unspent fuel and byproducts of combustion carried by the exhaust gases. To mitigate such pollutants, some engines include secondary air injection systems, which introduce fresh air into an exhaust stream while the exhaust gases are still hot from combustion processes. As unspent fuel exits the combustion chamber, the unspent fuel is exposed to oxygen in the fresh air, allowing the unspent fuel to combust or oxidize, essentially cleaning the exhaust gases.

SUMMARY

One embodiment of the invention relates to a muffler for a combustion engine. The muffler includes walls forming a chamber, a first inlet, a first outlet, and a conduit. The first inlet is designed to receive exhaust gases from an exhaust duct of the engine. The exhaust gases pass through the chamber when moving from the first inlet to the first outlet. The exhaust gases then exit the muffler through the first outlet. The conduit extends between a second inlet and a second outlet. The second inlet is configured to receive fresh air entering the muffler. The fresh air then exits the conduit and is introduced into the exhaust gases through the second outlet.

Another embodiment of the invention relates to a muffler for a combustion engine. The muffler includes a first and second inlet, a first and second outlet, walls forming a chamber, and a conduit extending between the second inlet and outlet. The first inlet is designed to receive exhaust gases from an exhaust duct of the engine. The exhaust gases pass through the chamber when moving from the first inlet to the first outlet. The exhaust gases then exit the muffler through the first outlet. The second inlet is designed to receive fresh air entering the muffler, and the second outlet is designed to introduce the fresh air into the exhaust gases. The conduit extends between the second inlet and the second outlet, and at least a portion of the conduit extends within the chamber such that heat is transferred from the exhaust gases to the fresh air during operational use of the muffler. Further, the conduit extends at least partially through the first inlet.

Yet another embodiment of the invention relates to an engine having a secondary air injection system. The engine includes an engine block and a cylinder head attached to the engine block. At least one of the engine block and the cylinder head has a combustion chamber formed therein and an exhaust duct. The exhaust duct has a first end adjacent to the combustion chamber and a second end that opens to a side of at least one of the engine block and the cylinder head. The engine further includes a conduit extending at least partially through the second end of the exhaust duct and into the exhaust duct. The conduit is configured to introduce fresh air into exhaust gases exiting the combustion chamber.

Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying figures, wherein like reference numerals refer to like elements, in which:

FIG. 14 is a top view of the muffler of FIG. 13.

FIG. 15 is a bottom view of the muffler of FIG. 13.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
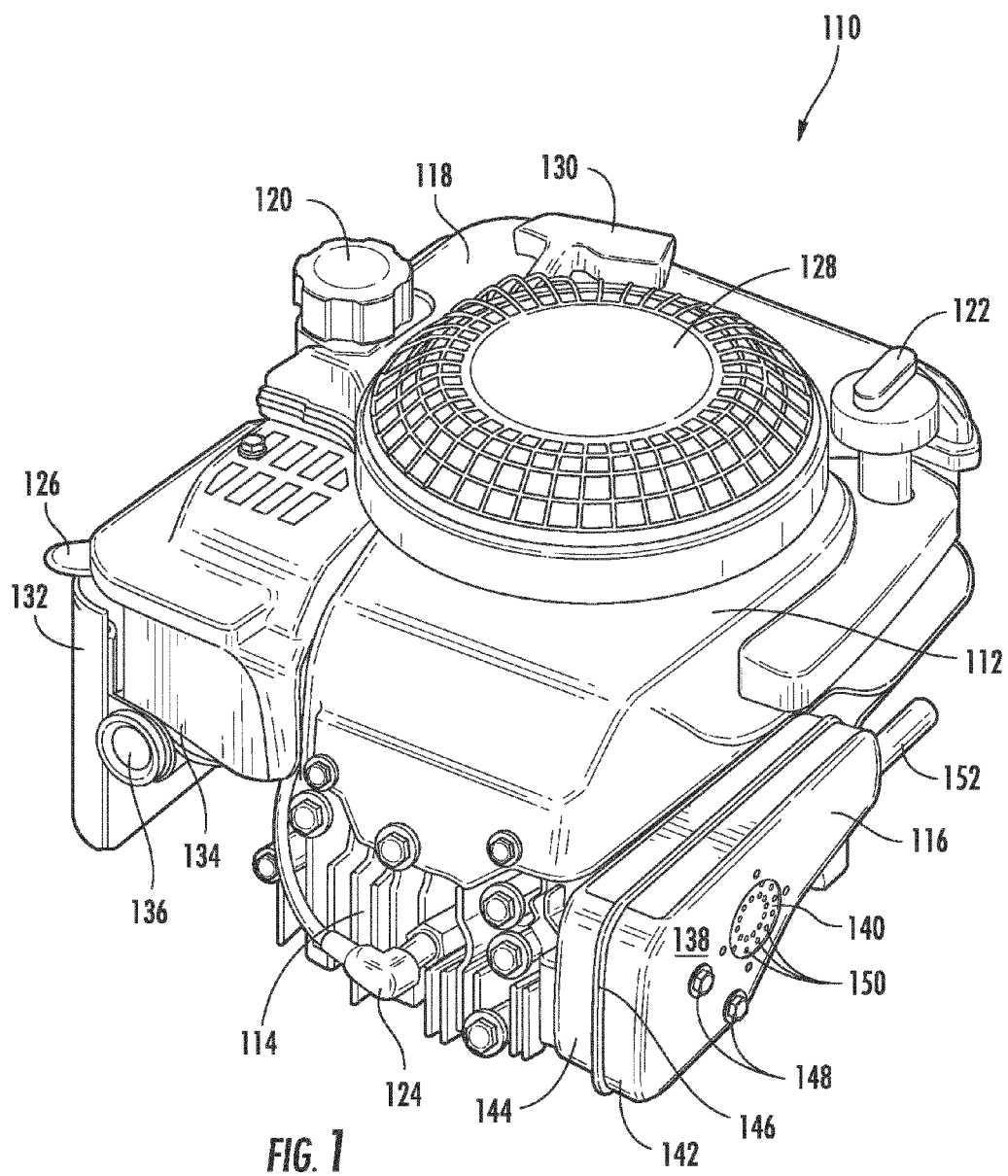
FIG. 1 is a perspective view of an engine according to an exemplary embodiment of the invention.

Referring to FIG. 1, an engine 110 includes a secondary air injection system designed to reduce pollutant emissions of the engine 110. According to an exemplary embodiment, the engine 110 is configured to power a broad range of equipment, including lawn mowers, pressure washers, electric generators, snow throwers, and other equipment. In some embodiments, the engine 110 is vertically shafted (as shown in FIG. 1), while in other embodiments, the engine is horizontally shafted. According to an exemplary embodiment, the engine 110 is a small, single-cylinder, gasoline-powered, four-stroke cycle internal combustion engine. However a broad range of engines, especially small combustion engines, may benefit from the teachings disclosed herein. For example, in other contemplated embodiments, an engine may include two, three, or more cylinders, may be a diesel engine, or may have a two-stroke cycle.

Figure 9:
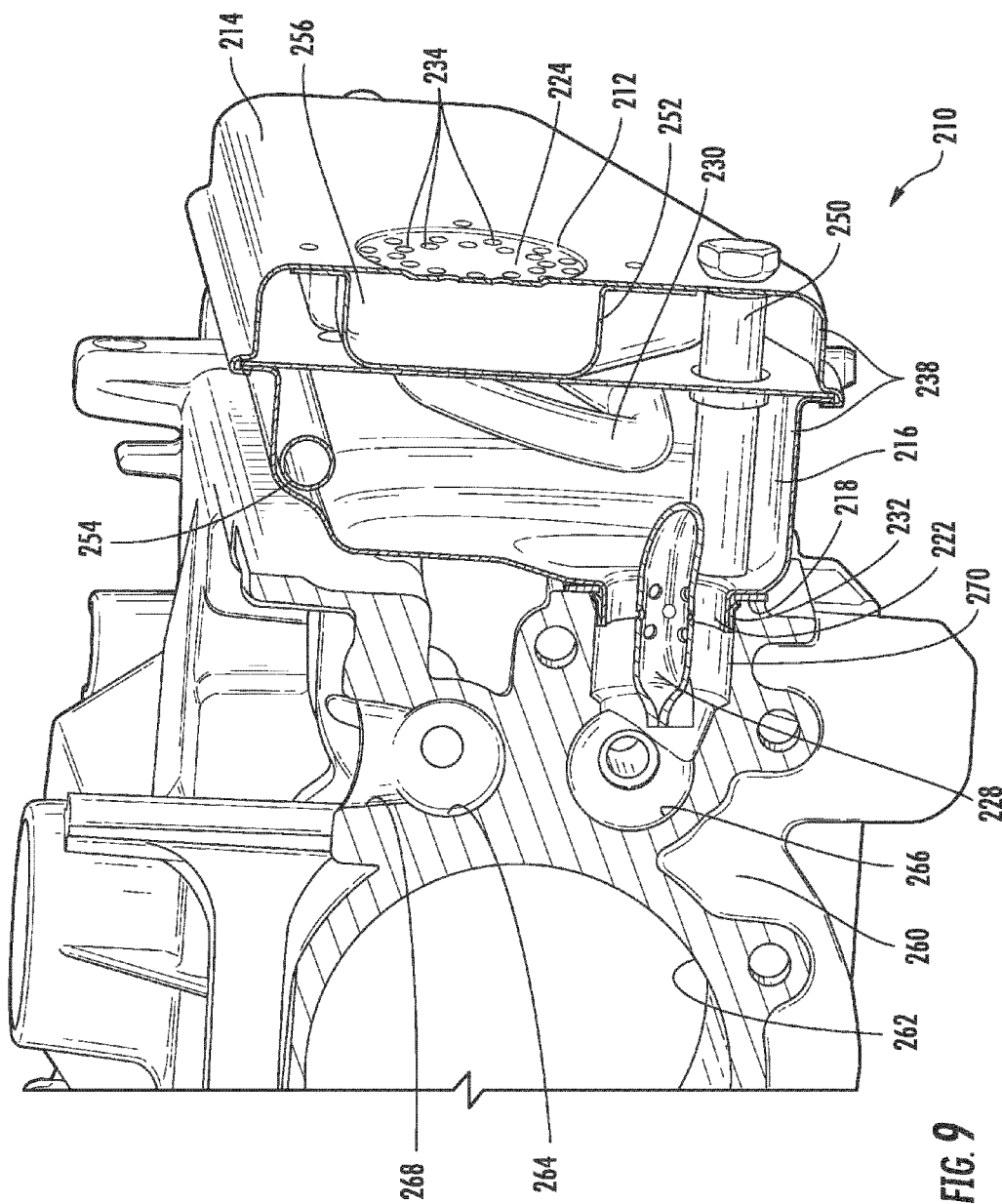
FIG. 9 is a sectional view of the muffler of FIG. 2, taken along line 9-9 of FIG. 2, coupled to an engine according to an exemplary embodiment of the invention.
Figure 22:
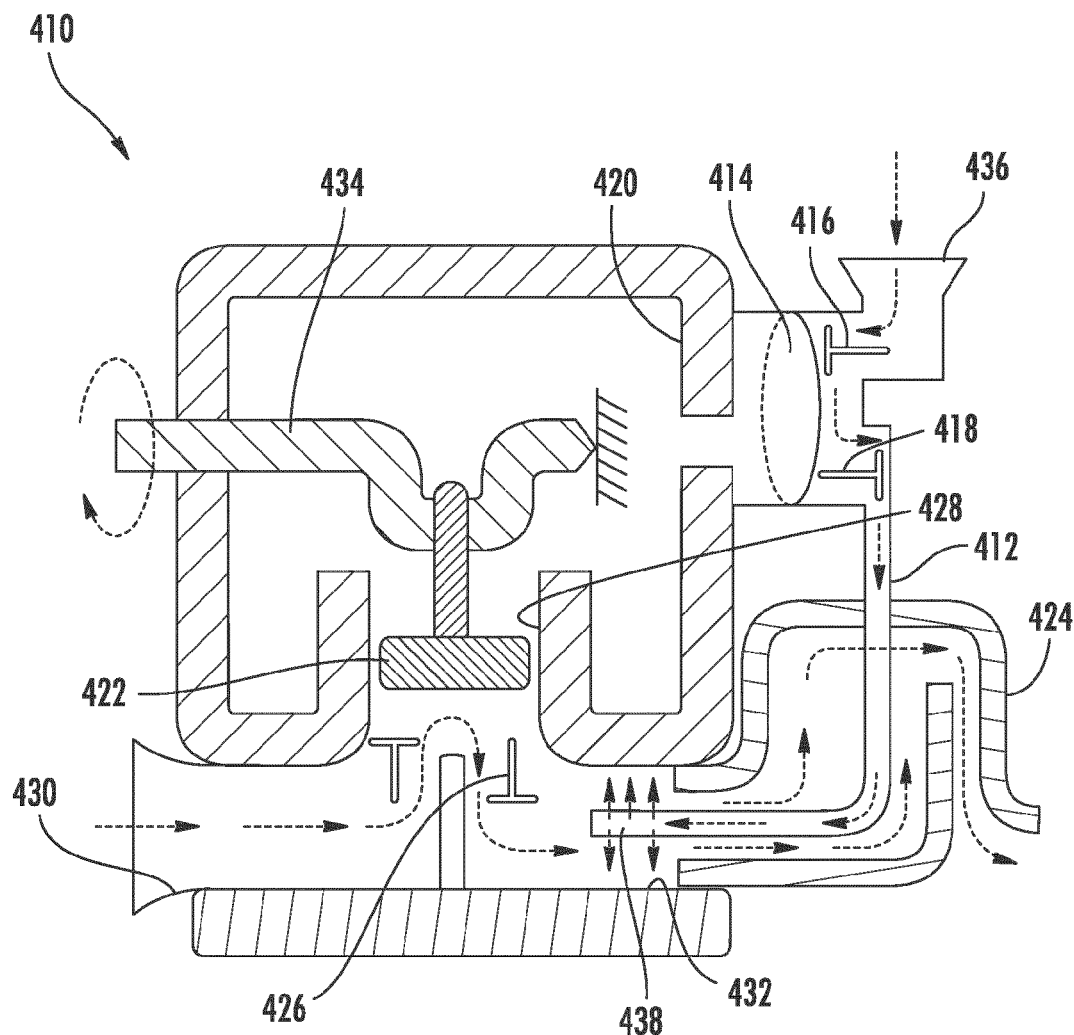
FIG. 22 is a schematic view of an engine according to an exemplary embodiment of the invention.

The engine 110 includes a cover 112, an engine block (see, e.g., engine block 260 as shown in FIG. 9), a cylinder head 114, and a muffler 116. The cover 112 is fastened to the engine block and the cylinder head 114 is mounted to an end (e.g., side, top, etc.) of the cylinder block of the engine 110. During operation of the engine 110, a piston (see, e.g., piston 422 as shown in FIG. 22) translates back and forth within the cylinder block, powered by combustion processes. The combustion processes occur in a combustion chamber (see, e.g., combustion chamber 428 as shown in FIG. 22) formed in the cylinder block, between the piston and the cylinder head 114. In some embodiments, the engine 110 further includes a fuel tank 118 with a cap 120, an oil fill cap 122, a sparkplug 124, a throttle lever 126, a recoil starter 128 with a handle 130, an air intake 132 (e.g., main or primary air intake), and a carburetor 134 with a priming bulb 136.

Figure 3:
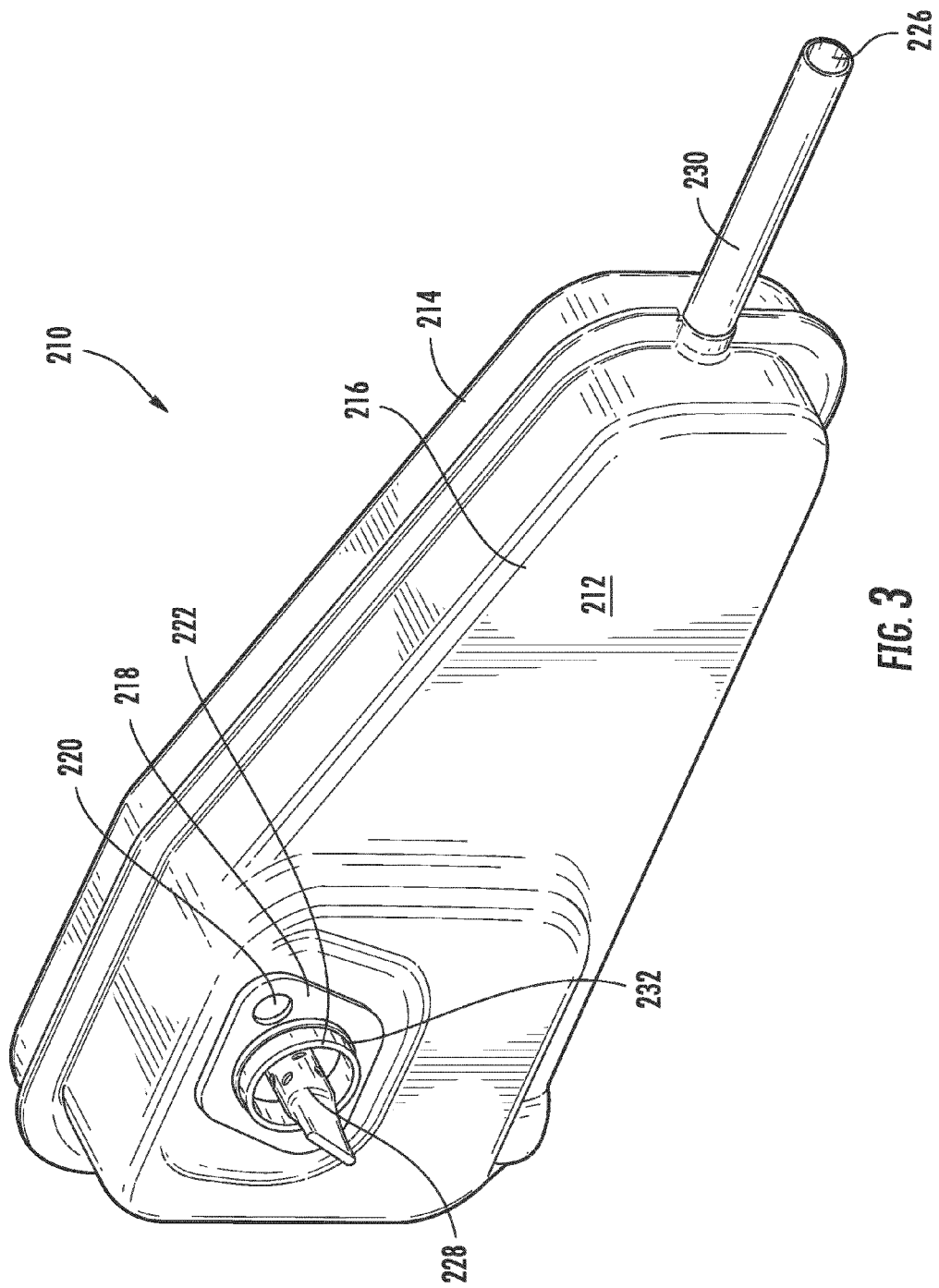
FIG. 3 is a rear perspective view of the muffler of FIG. 2.

Still referring to FIG. 1, the muffler 116 is at least partially formed from two shells 142, 144 crimped together (see, e.g., seam 146) and includes a housing 138 having an inlet (e.g., exhaust inlet, main inlet; see, e.g., first inlet 222 as shown in FIG. 3) and an outlet 140 (e.g., main outlet, exhaust pipe, opening, etc.). Additionally, the muffler 116 is fastened to the engine with threaded fasteners 148 (e.g., bolts, screws, etc.) or other fasteners (e.g., welds, hooks, etc.). In some embodiments the threaded fasteners 148 may be high-temperature bolts due to the high temperatures of exhaust gases passing through the muffler 116 (e.g., including ceramic, cement, or other materials having a generally low rate of thermal expansion). In some embodiments, a heat shield or cage (not shown) surrounds the muffler 116.

Figure 8:
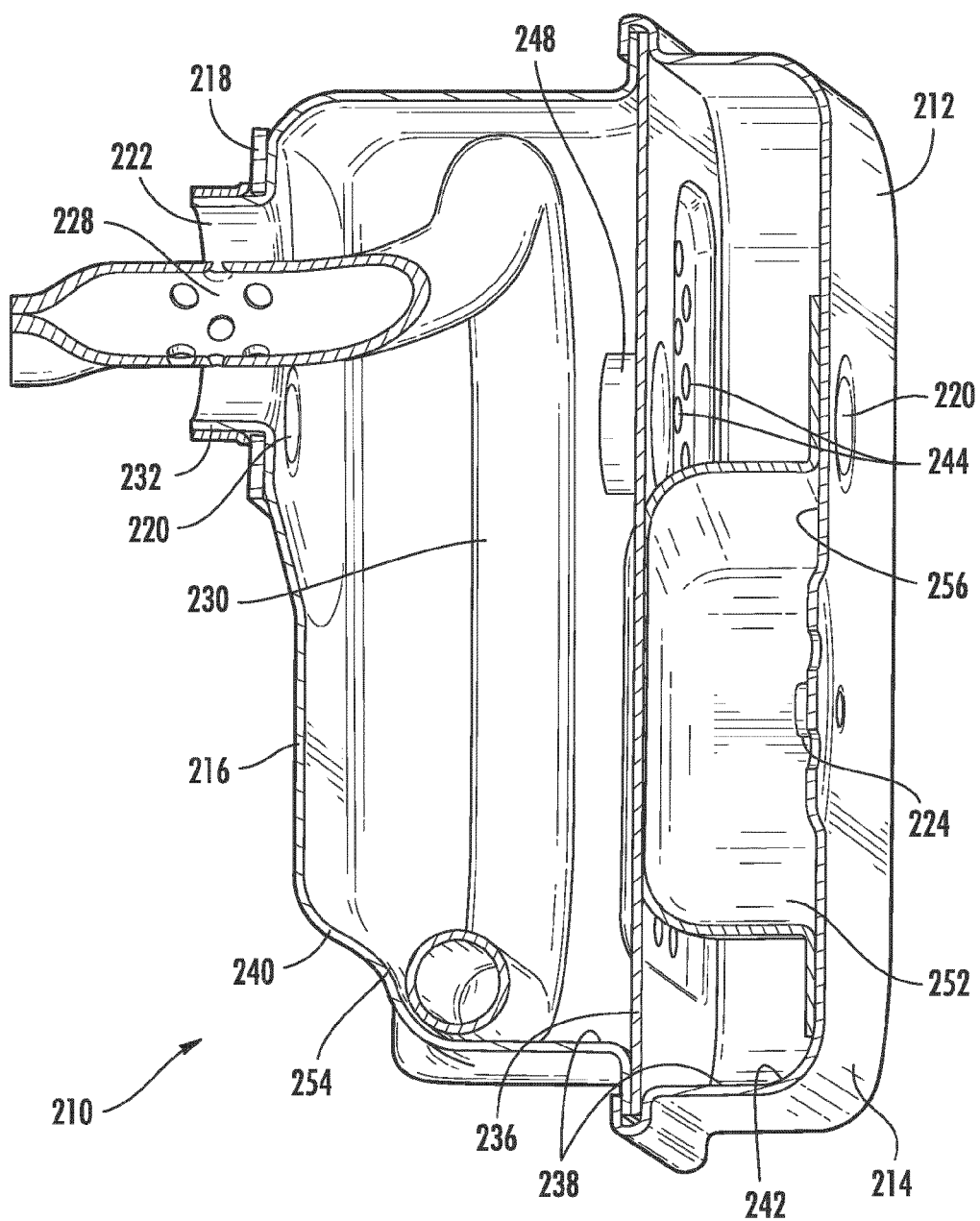
FIG. 8 is a sectional view of the muffler of FIG. 2, taken along line 8-8 of FIG. 2.

On the side of the muffler 116 facing the engine block, the muffler 116 includes the inlet, which couples to an exhaust duct (e.g., exhaust manifold, exhaust port; see, e.g., exhaust duct 270 as shown in FIG. 9) of the engine block. Exhaust gases and engine noise from the combustion processes of the engine 110 enter the inlet and proceed through a chamber (e.g., partitioned chamber, see, e.g., chamber 238 as shown in FIG. 8) of the muffler 116 that includes an arrangement of internal baffles, panels, separators, walls, and/or other structures designed to control or dampen the engine noise. In some embodiments, the chamber and internal structures are specifically sized, contoured, and arranged to dissipate the engine noise via destructive interference. The housing 138 of the muffler 116 further includes the outlet 140 (e.g., perforated outlet), within which is formed an array of small holes 150, allowing the exhaust gases to pass therethrough when exiting the muffler 116.

Still referring to FIG. 1, coupled to the muffler 116 is a conduit 152 (e.g., pipe, tube, passage) through which fresh air (e.g., outside air) enters the muffler 116 and the engine 110 (e.g., through the muffler 116 and/or into an exhaust port of the engine 110). According an exemplary embodiment, the fresh air is drawn or pumped into the conduit 152 and introduced to the exhaust gases that are exiting the combustion chamber of the engine 110, before the exhaust gases enter the chamber of the muffler 116, where the exhaust gases expand and cool. Introduction of the fresh air into the exhaust gases may help reduce hydrocarbon and carbon monoxide pollutants emitted from the engine 110 by facilitating the combustion of unspent fuel.

In some embodiments, the conduit 152 may extend from the muffler housing 138, as shown in FIG. 1. In other embodiments the conduit may be flush or recessed with respect to the housing 138. While the conduit 152 in FIG. 1 is cylindrical, in other embodiments the conduit may be otherwise shaped. In contemplated embodiments, two or more conduits, similar to the conduit 152, may draw or pump fresh air into the muffler and join together in a manifold. While the conduit 152 is shown as open to the atmosphere in FIG. 1, in other embodiments, additional mechanisms (e.g., pumps, valves) may be coupled to the conduit 152, to control or to facilitate the air flow therethrough.

Figure 2:
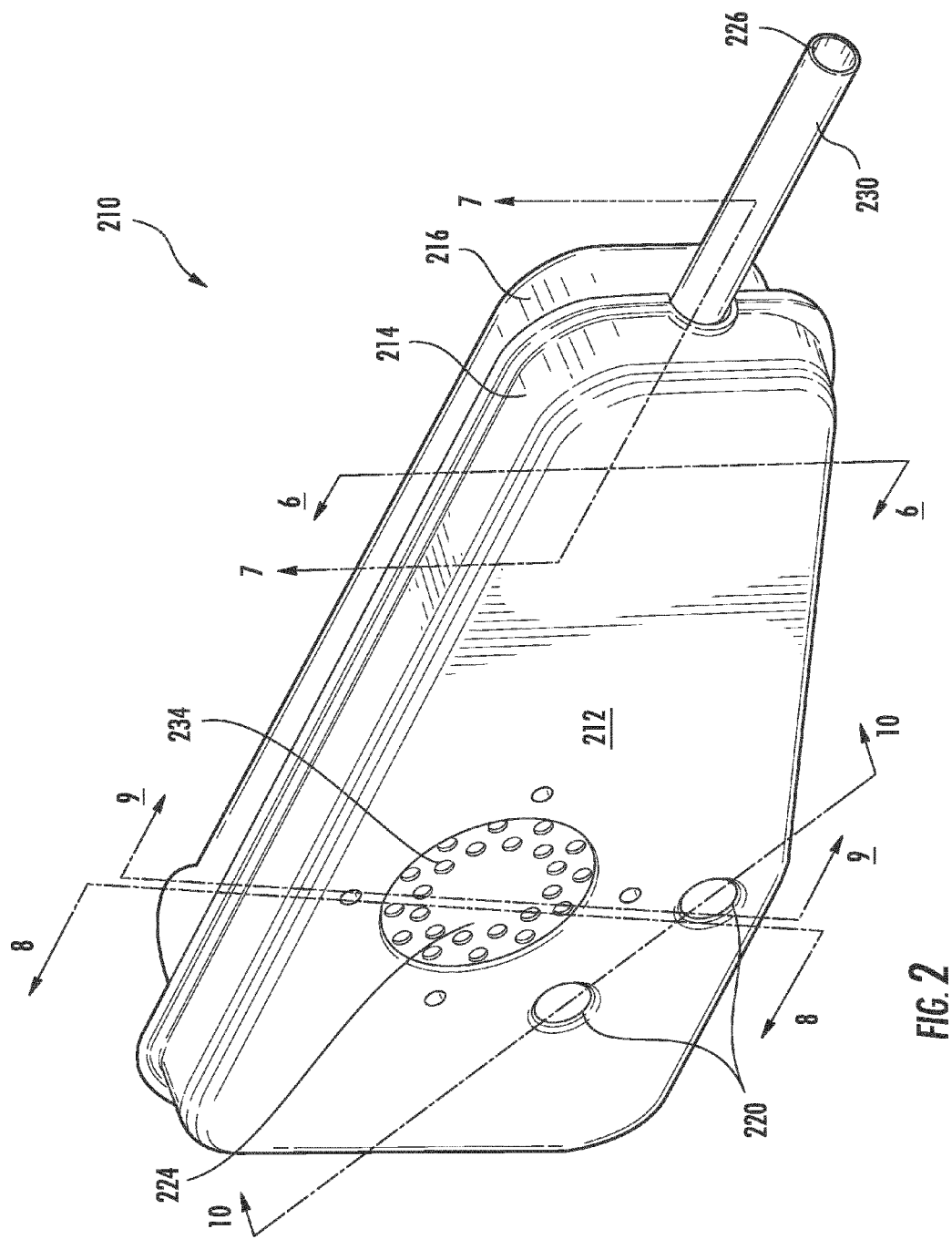
FIG. 2 is a front perspective view of a muffler according to an exemplary embodiment of the invention.

Referring now to FIGS. 2-3, a muffler 210 for an internal combustion engine (see, e.g., engine 110 as shown in FIG. 1) includes a housing 212 formed from a first shell 214 and a second shell 216 fastened together. The shells 214, 216 form outer walls of the muffler 210. According to an exemplary embodiment, the first and second shells 214, 216 are stamped from sheet metal (e.g., steel, aluminum, etc.), and crimped together during manufacturing of the muffler 210. In some embodiments, the muffler 210 further includes a gasket 218 and holes 220 for fasteners to attach the muffler 210 to an engine block 260 (FIG. 9) or a cylinder head (see, e.g., cylinder head 114 as shown in FIG. 1). While the muffler 210 of FIGS. 2-3 is substantially rectangular, other contemplated embodiments include cylindrical, square, or otherwise-shaped mufflers.

Still referring to FIGS. 2-3, the muffler 210 further includes a first inlet 222 (FIG. 3), a first outlet 224 (FIG. 2), a conduit inlet 226 (e.g., second inlet), and a conduit outlet 228 (FIG. 3) (e.g., second outlet). A conduit 230 (e.g., pipe, tube, network of interconnected pipes) extends between the conduit inlet 226 and conduit outlet 228, providing a flow path for fresh air to pass through the muffler 210 and into the engine. The conduit is preferably made from a tubing material with a high thermal conductivity for transferring heat therethrough, such as aluminum, copper, steel, or alloys thereof.

Figure 13:
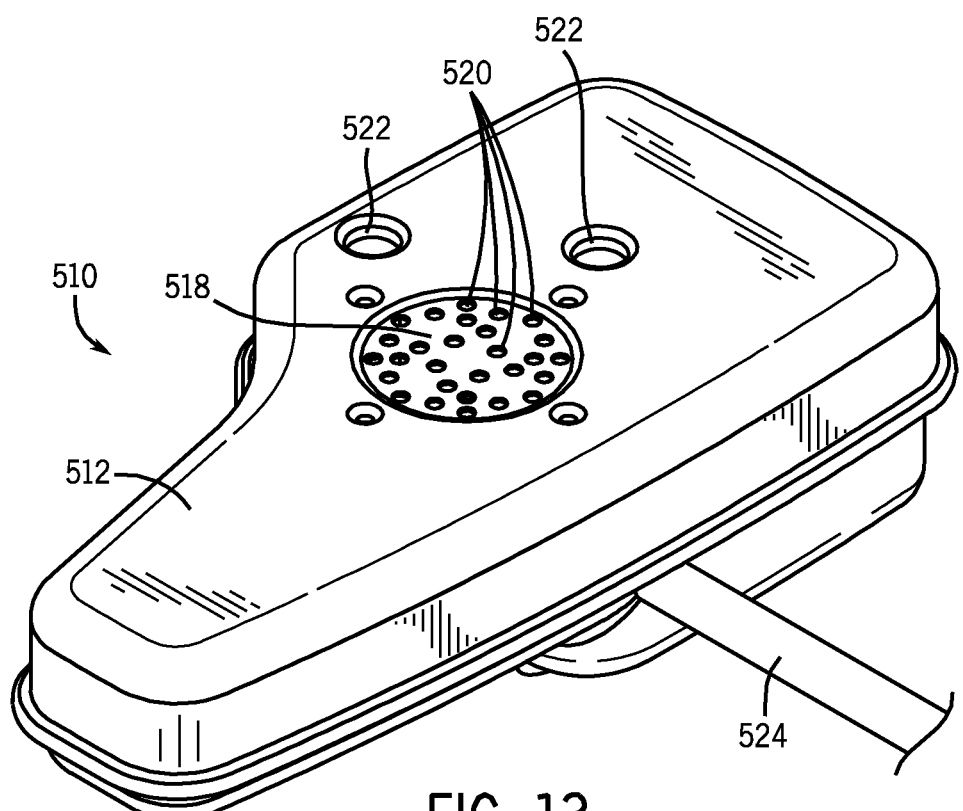
FIG. 13 is a perspective view of a muffler according to yet another exemplary embodiment of the invention.

According to an exemplary embodiment, the conduit 230 is arranged such that waste heat carried by the exhaust gases is transferred to the conduit and then to the fresh air passing through the conduit 230, heating the fresh air. The heated fresh air is then introduced into exhaust gases exiting the combustion chamber (see, e.g., combustion chamber 428 as shown in FIG. 13) of the engine, preferably before the exhaust gases enter the chamber 238 (FIG. 8) of the muffler 210. In other contemplated embodiments, the fresh air and exhaust gases are introduced and mixed in the chamber 238 of the muffler 210.

The first inlet 222 and first outlet 224 are intended to allow exhaust gases to exit the engine by way of the muffler 210. According to an exemplary embodiment, the first inlet 222 includes a tube 232 (e.g., extension) extending from the housing 212 of the muffler 210, which is configured (e.g., sized and contoured) to couple with an exhaust duct 270 of the engine block 260 (FIG. 9). In some embodiments, a pressure fit between the tube 232 and the exhaust duct 270 prevents exhaust gases from passing around the first inlet 222 and avoiding the muffler 210. The first outlet 224 is shown in FIG. 2 as a portion of the housing 212, including a plurality of small openings 234 (e.g., holes, perforations) in the housing 212. In other embodiments, the first outlet may be a pipe extending from the housing 212, or simply a large opening (e.g., hole, slot, aperture) in the housing 212.

Figure 4:
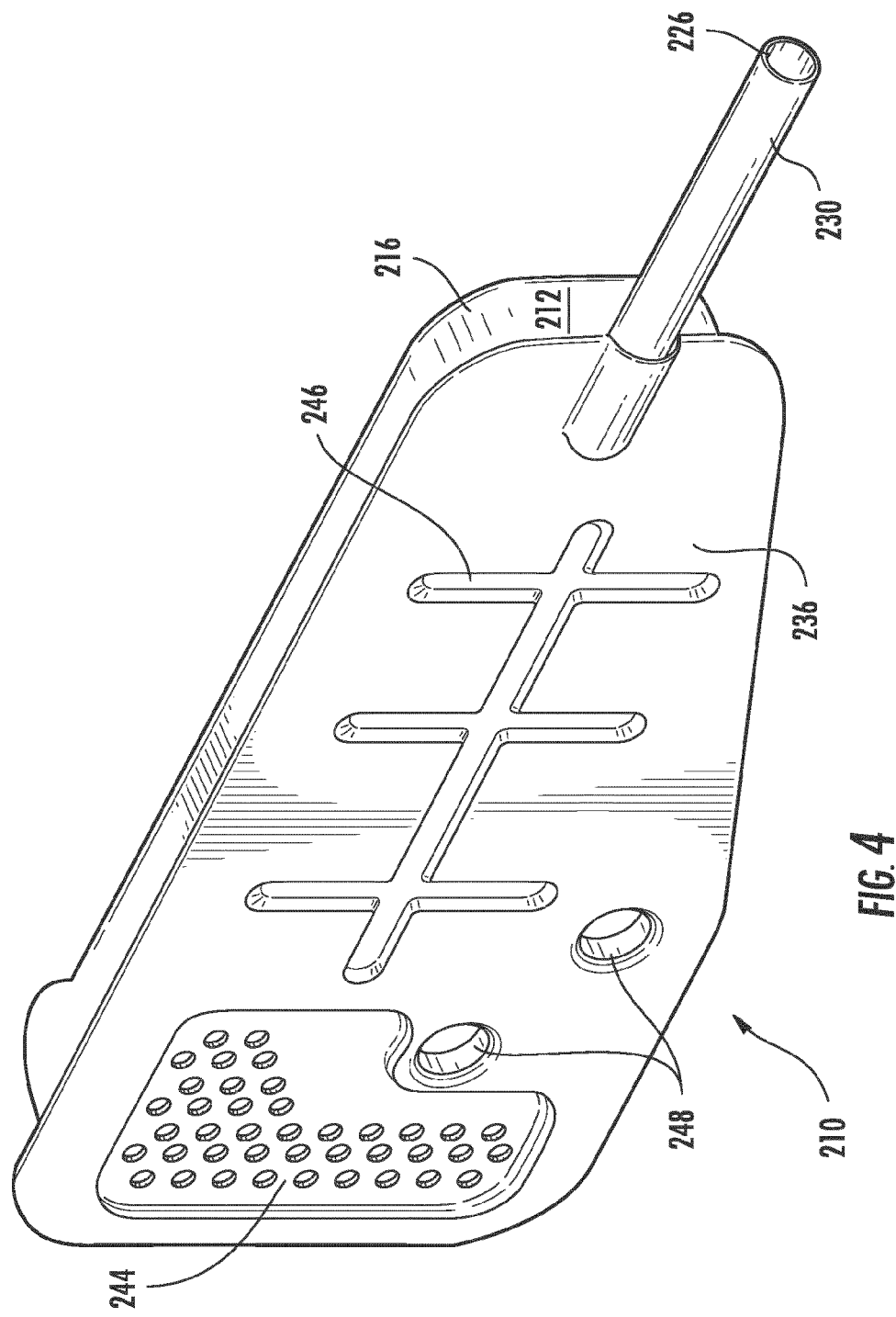
FIG. 4 is a perspective view of a portion of the muffler of FIG. 2.

Referring to FIG. 4, a separator 236 serves to partition the chamber 238 (FIG. 8) formed by the shells 214, 216 into parts 240, 242 (e.g., sub-chambers). In some embodiments, the separator 236 may be stamped from sheet metal and fixed in the muffler 210, between the first and second shells 214, 216. The separator 236 includes an opening 244 (e.g., perforations), through which the exhaust gases may pass between the parts 240, 242 of the chamber 238. Additionally, the separator 236 includes extended portions 246 thereof (e.g., extensions, protrusions) providing increased rigidity to the separator 236, resonance to the chamber, and/or structural support for the conduit 230. Two openings 248 through the separator 236 allow the fasteners 250 (FIG. 9) to pass therethough. In some embodiments, the muffler 210 includes a second separator 252. In other embodiments, one or more separators do not extend fully across the chamber 238.

Figure 5:
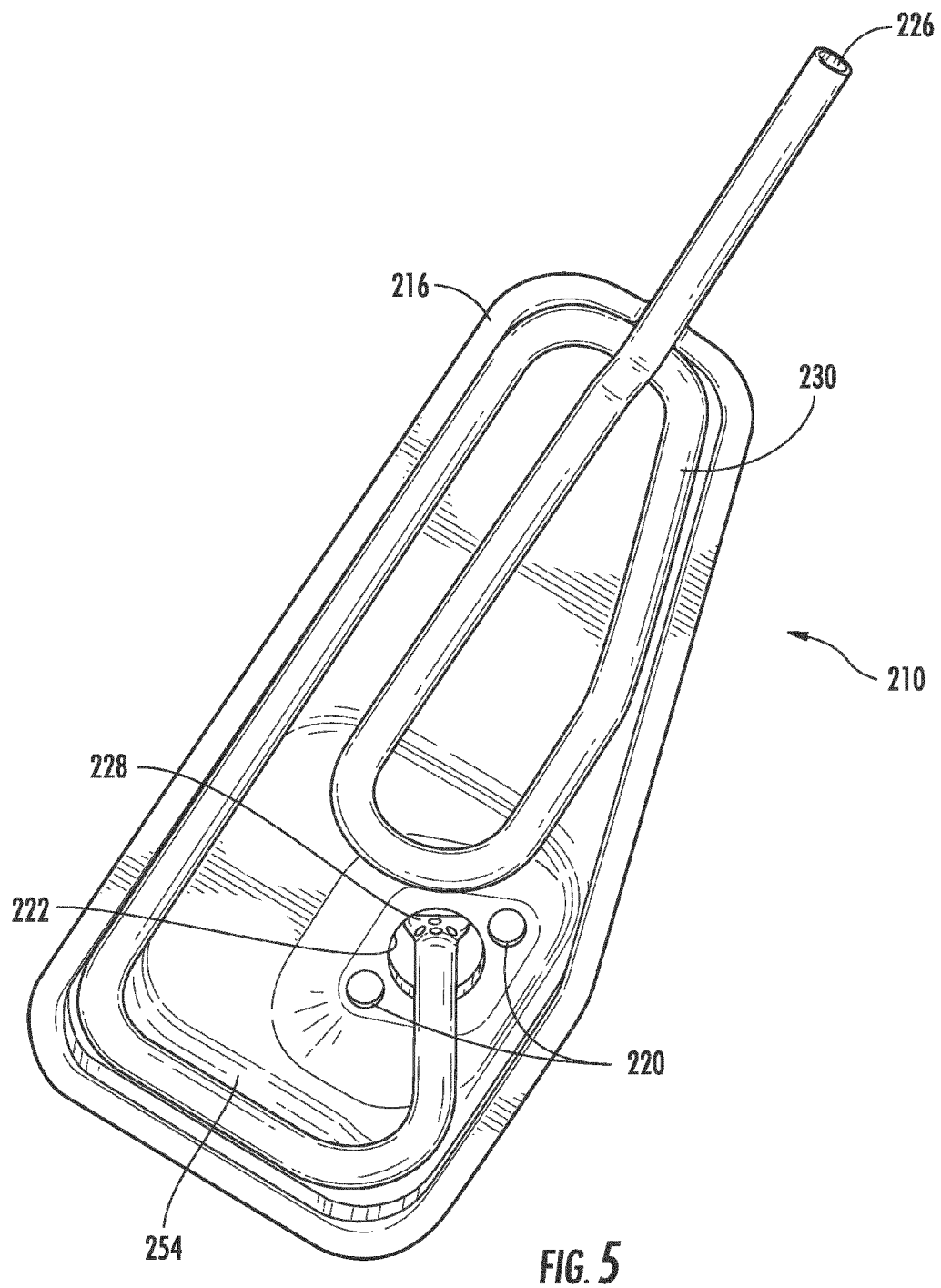
FIG. 5 is a perspective view of another portion of the muffler of FIG. 2.
Figure 11:
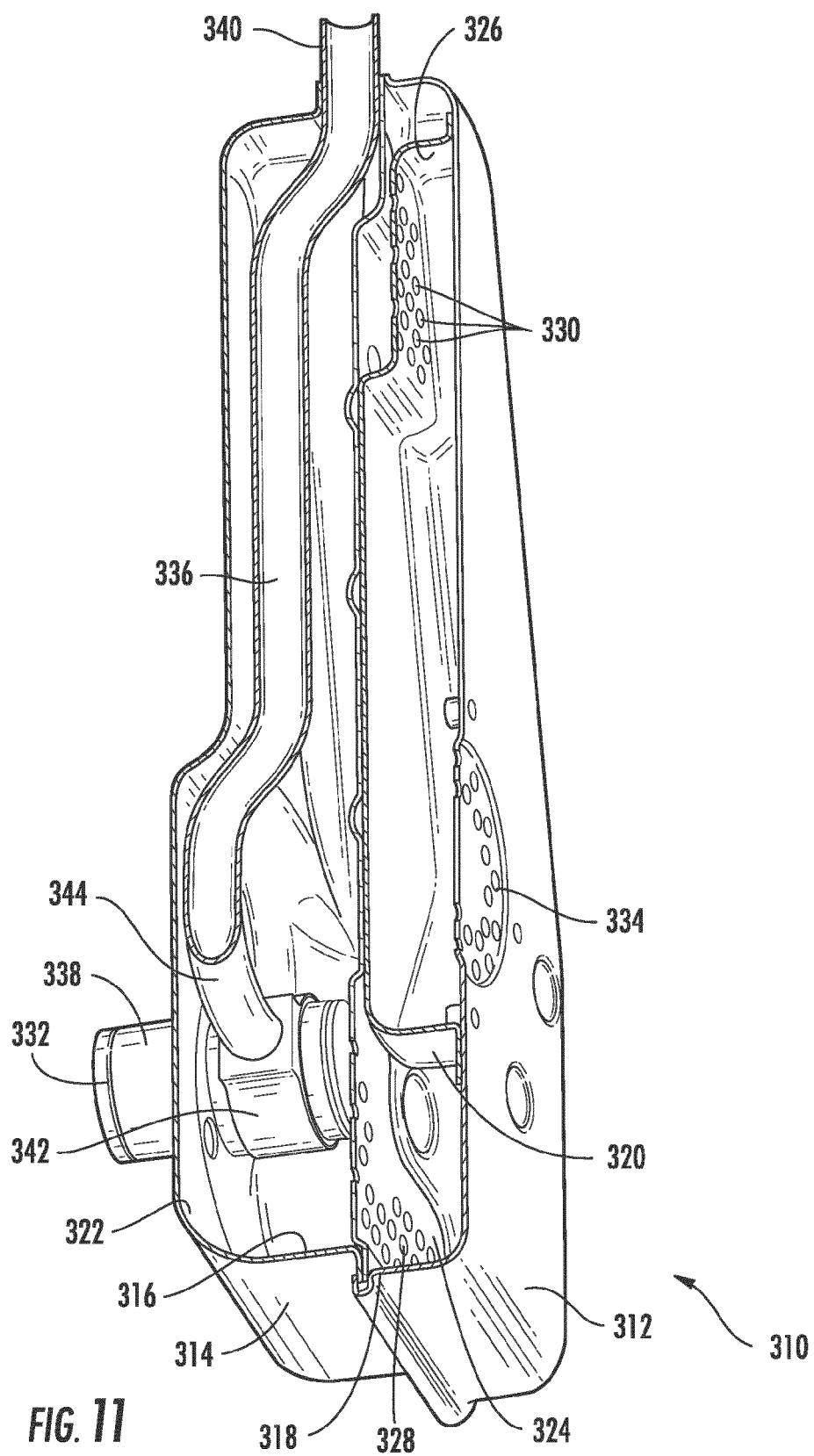
FIG. 11 is a sectional view of a muffler according to another exemplary embodiment of the invention.
Figure 17:
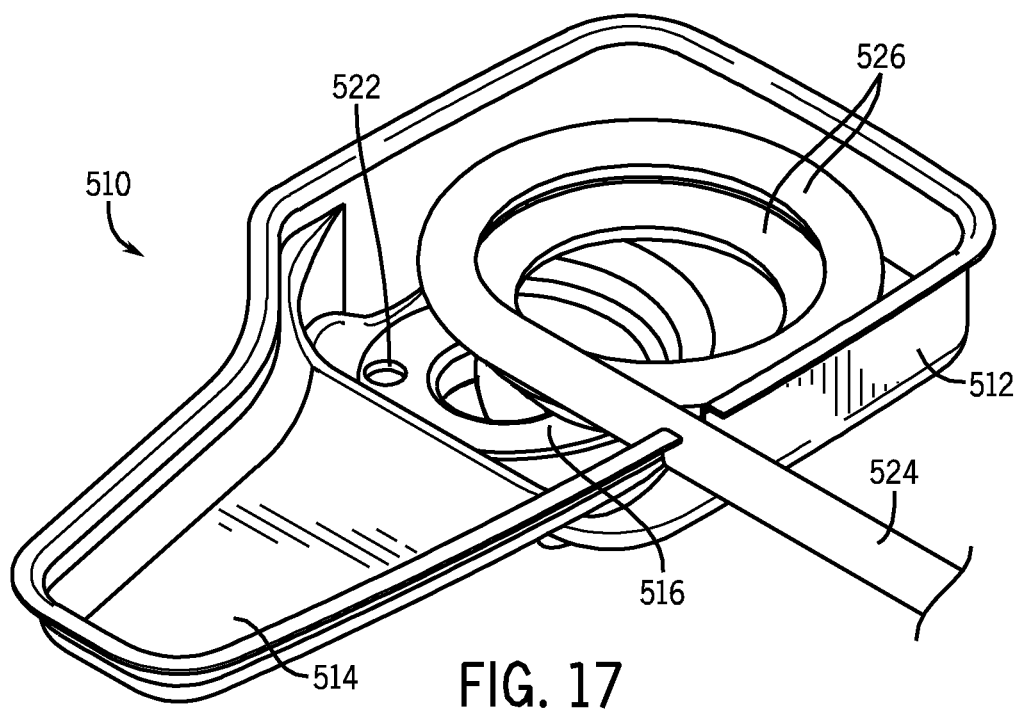
FIG. 17 is a perspective view of a portion of the muffler of FIG. 13.
Figure 18:
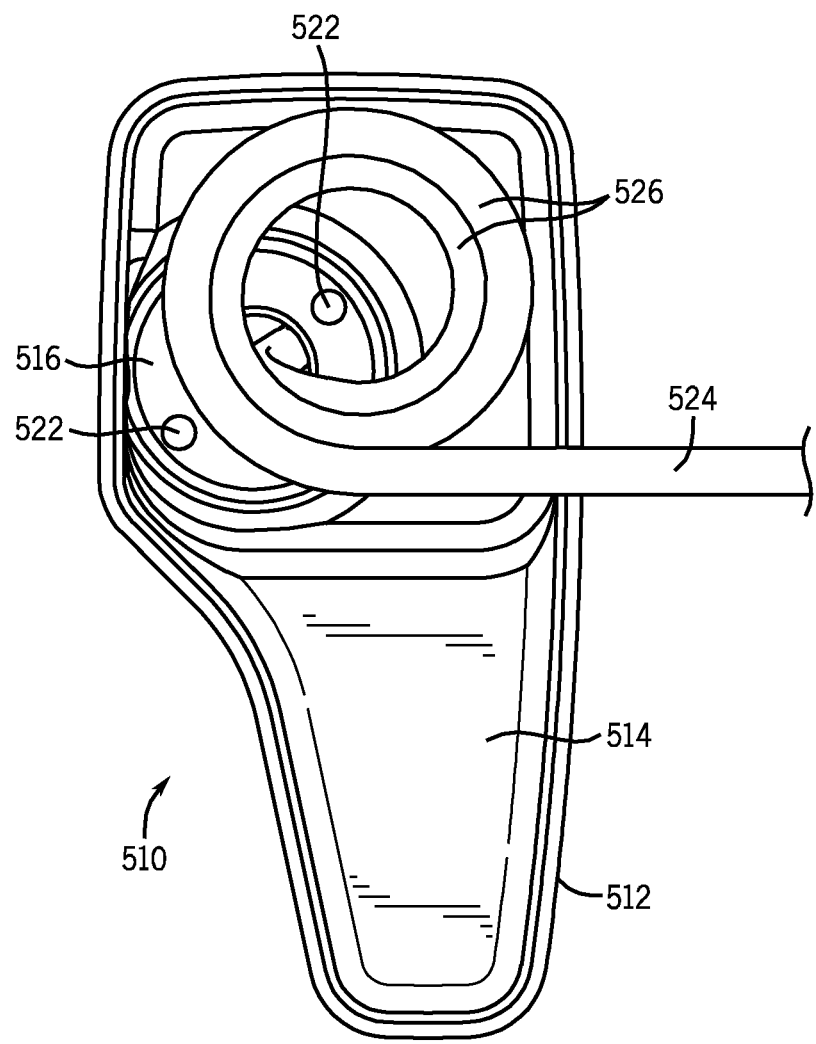
FIG. 18 is a top view of the portion of the muffler of FIG. 13.

Referring to FIG. 5, the second shell 216 of the muffler 210 forms a recess 254 within which the conduit 230 extends. According to an exemplary embodiment, the conduit 230 extends around the interior of the shell 216, and through the first inlet 222 (see also conduit 524 as shown in FIGS. 17-18). In other embodiments, a fresh-air conduit extends directly (e.g., in a substantially straight line) between a side of the housing 212 and the first inlet 222 (see, e.g., conduit 336 as shown in FIG. 11). Although shown as separate from the shell in FIG. 5 (e.g., a separate pipe fastened to or within the shell), in other embodiments a fresh-air conduit may be integrally formed in the shell 216. In still other embodiments, a fresh-air conduit may be formed in the separator. In some embodiments, a fresh-air conduit may be formed between surfaces of both the separator and the shell, when the muffler is assembled.

Increasing the surface area of the conduit 230 within, through, adjacent to, or proximate to the chamber 238 of the muffler 210 allows an increased amount of waste heat to transfer from the hot exhaust gases, through the walls of the conduit 230, and to the fresh air passing through the conduit 230. Further, location of a substantial length of the conduit 230 (e.g., at least six inches, at least nine inches, at least a foot, etc.) interior to the muffler 210 increases heat transfer from the hot exhaust gases to the fresh air passing through the conduit 230. As such, during operation of the engine, waste heat is recovered from the exhaust gases.

According to an exemplary embodiment, the conduit 230 curves around the interior of the shell 216, forming at least one loop within the shell 216. Curvature (e.g., looping, bending, folding, etc.) of the conduit 230 (see also conduit 524 as shown in FIGS. 17-18) allows for a greater length of the conduit 230 to extend within a muffler of a given size. The added length of the conduit allows for more heat transfer. In other embodiments, a fresh-air conduit includes narrow ridges extending circumferentially around the conduit to increase the surface area of the conduit to increase heat transfer. In still other embodiments, the cross-sectional geometry of a fresh-air conduit is flattened to increase the ratio of surface area to volume thereof.

According to an exemplary embodiment, the conduit inlet 226 is coupled directly to or positioned proximate to the chamber 238 of the muffler 210. Positioning the conduit inlet 226 close to the chamber 238 (the heat source) is believed to reduce excess drag losses within the conduit 230. However, in other embodiments, the conduit inlet 226 is coupled to an air intake (see, e.g., air intake 132 as shown in FIG. 1) of an engine, and directed to the muffler for heating, before extending into an exhaust duct of the engine.

Figure 19:
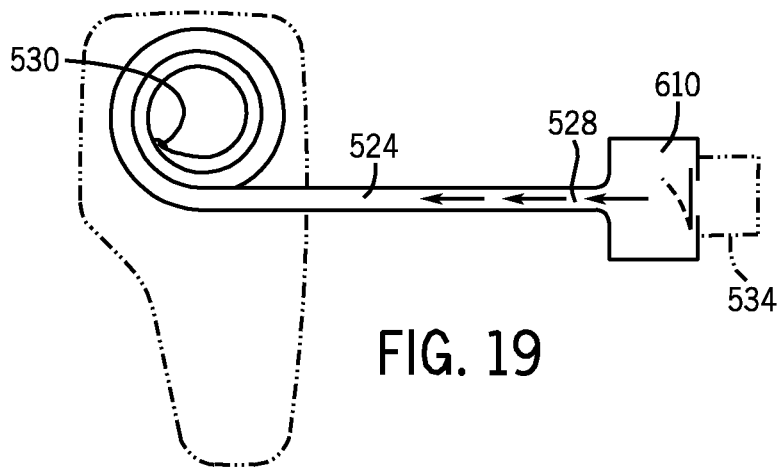
FIGS. 19-21 are schematic diagrams of secondary air injection systems according to exemplary embodiments of the invention.

Pumps and valves (e.g., check valves, one-way valves; see, e.g., pump 414 and check valves 416, 418 as shown in FIG. 22) may control and facilitate the flow of fresh air through the conduit 230. In some embodiments, one or more passive check valves are attached to the end of the conduit 226, and respond to air pressure dynamics within the chamber, exhaust port 270 (FIG. 9), and/or conduit 230 to periodically admit fresh air into the conduit 230 and to control the air flow into the muffler 210. In one such embodiment, a one-way valve on an end of the conduit 230 only admits air into the conduit 230 (see, e.g., reed valve 610 as shown in FIG. 19).

Figure 6:
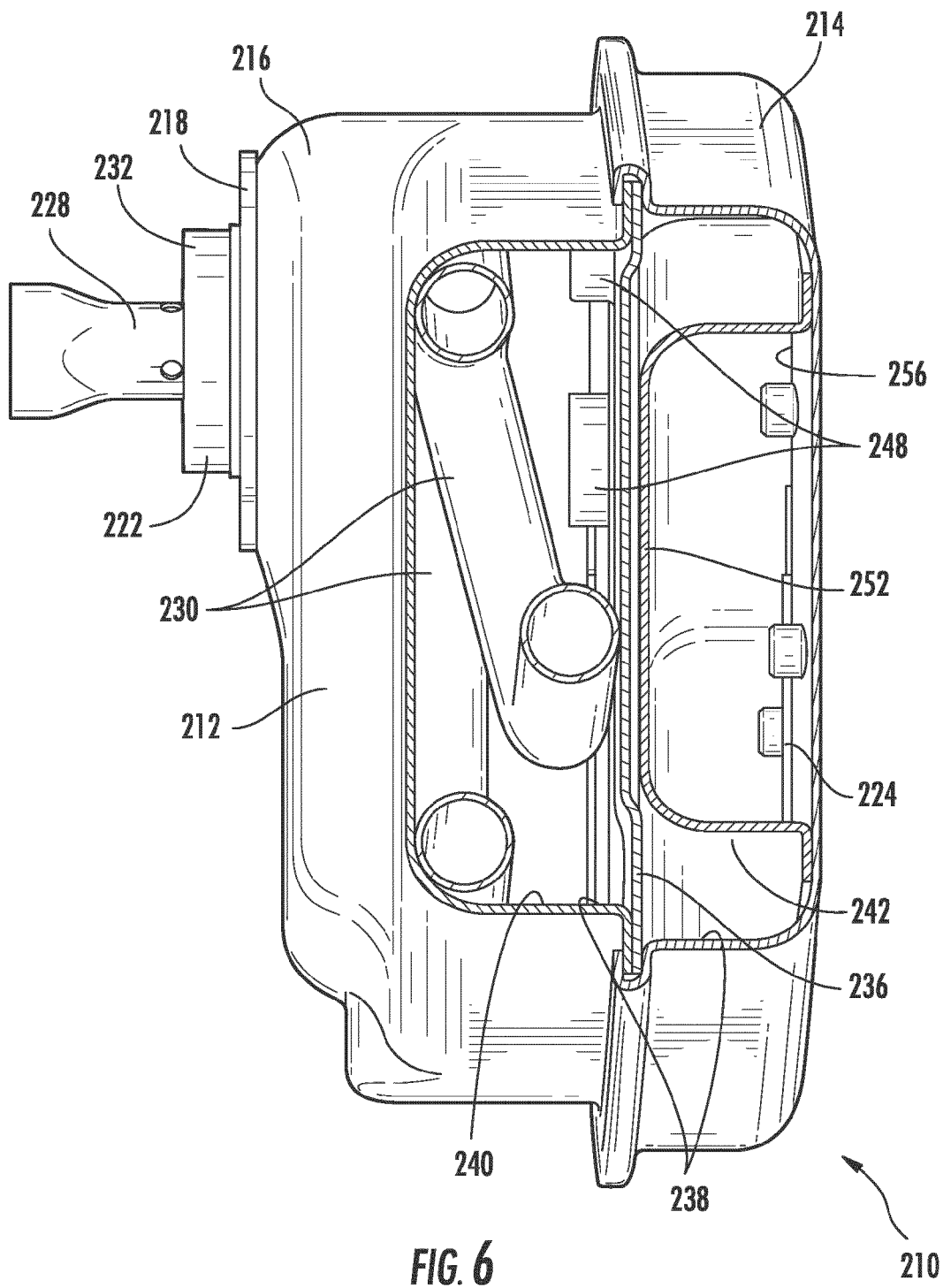
FIG. 6 is a sectional view of the muffler of FIG. 2, taken along line 6-6 of FIG. 2.
Figure 7:
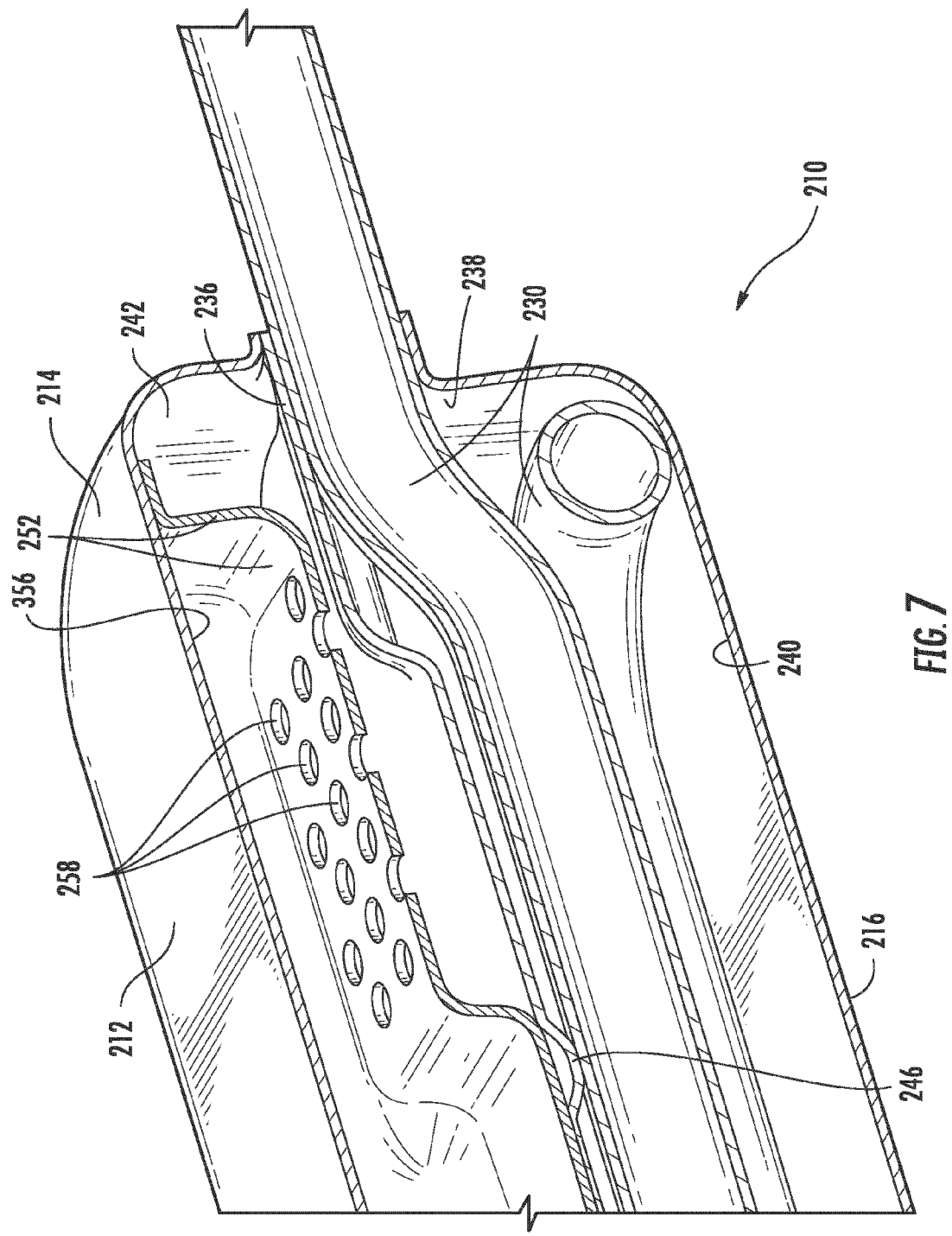
FIG. 7 is a sectional view of the muffler of FIG. 2, taken along line 7-7 of FIG. 2.

Referring to FIGS. 6-8, the muffler 210 includes the chamber 238, which is divided into at least three parts 240, 242, 256. The parts 240, 242, 256 are interconnected via openings 244, 258 (e.g., apertures, perforations) through which the exhaust gases may travel. During operation of the engine, exhaust gases enter the first part 240 through the first inlet 222. The first part 240 is bounded by the second shell 216 and the separator 236. The exhaust gases then pass through the first opening 244, into the second part 242 of the chamber 238, which is bounded by the first shell 214, the separator 236, and the second separator 252. The exhaust gases next pass through the second part 242 of the chamber 238, through the second opening 258, and into the third part 256 of the chamber 238, which is bounded by the second separator 252 and the first shell 214. From the third part 256, the exhaust gases exit the muffler 210 through the first outlet 224. Concurrently, the fresh air is drawn into the conduit inlet 226, through the conduit 230 where the fresh air is heated by the exhaust gases passing through the chamber 238, and the fresh air passes out of the conduit outlet 228.

Figure 10:
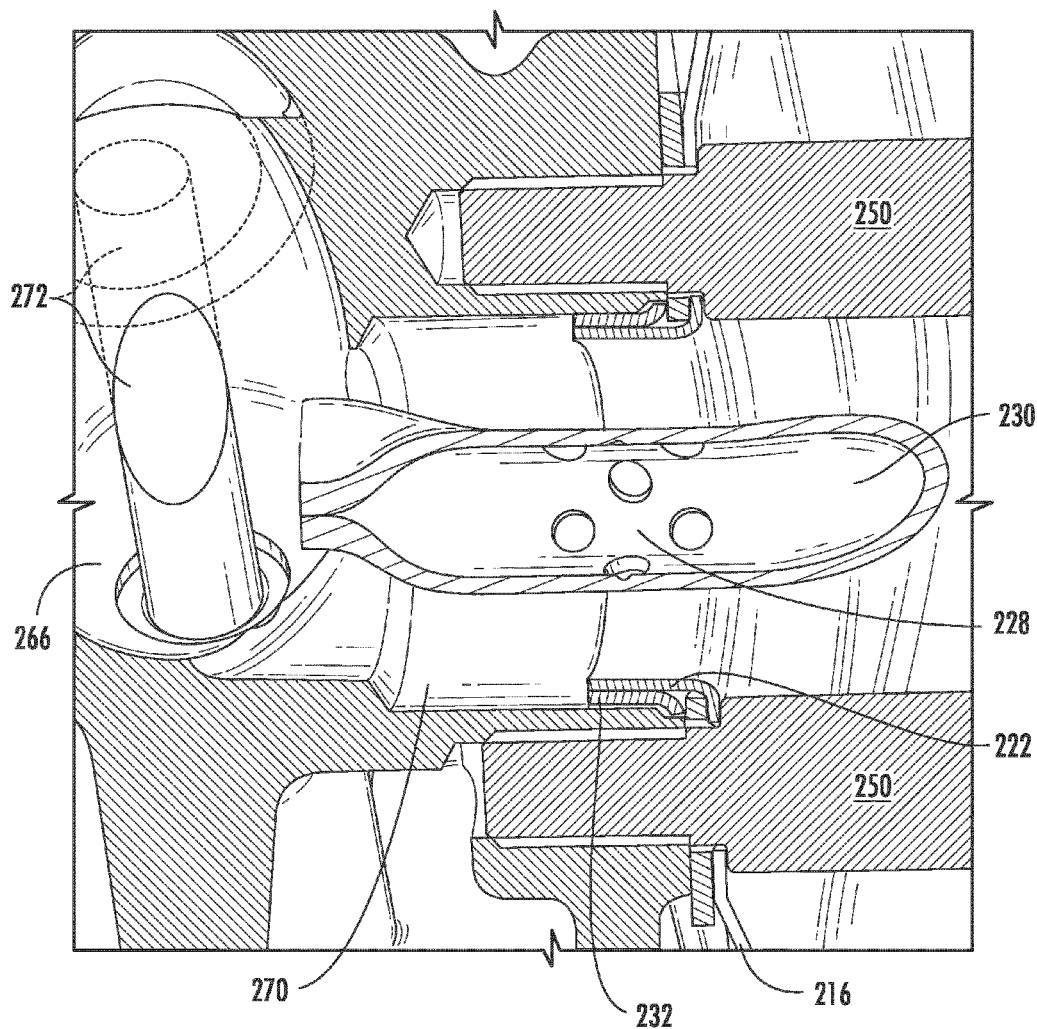
FIG. 10 is a sectional view of the muffler of FIG. 2, taken along line 10-10 of FIG. 2, coupled to the engine of FIG. 9.

Referring now to FIGS. 9-10, the muffler 210 is coupled to a cylinder block of an engine block 260, which includes a cylinder 262 and valve seats 264, 266. The valve seats 264, 266 are arranged in an L-head engine (e.g., flathead engine, sidevalve engine) configuration. An intake duct 268 (e.g., intake manifold) extends to the intake valve seat 264, and an exhaust duct 270 extends from the exhaust valve seat 266. In other embodiments, intake and exhaust valves may be arranged in an overhead valve (OHV) configuration, direct overhead valve (DOV) configuration, overhead cam configuration, or another configuration. In some embodiments, the threaded fasteners 250 couple the muffler 210 to the engine block 260. As shown in FIG. 9, the first inlet 222 of the muffler 210 is sized and contoured to be coupled to (e.g., connected to) the exhaust duct 270.

According to an exemplary embodiment, the conduit 230 extends into the exhaust duct 270 such that the fresh air is introduced to the exhaust gases proximate to an exhaust valve 272 (FIG. 10) (e.g., poppet valve), which controls the flow of exhaust gases from the combustion chamber (see, e.g., combustion chamber 428 as shown in FIG. 13) of the cylinder 262. Because the exhaust gases are believed to cool down generally in proportion to distance from the combustion chamber, positioning the conduit outlet 228 close to the combustion chamber allows for a greater amount of waste heat to be added to the fresh air from the exhaust gases, as well as allowing for introduction of the heated fresh air to higher-temperature of exhaust gases, believed to improve the removal of pollutants in the exhaust gases (e.g., via oxidation, afterburning, secondary combustion).

Referring now to FIG. 11, a muffler 310 includes a first shell 312 crimped to a second shell 314, the shells 312, 314 forming a chamber 316. Between the shells 312, 314 the muffler 310 further includes a first separator 318 and a second separator 320, where the separators 318, 320 divide the chamber 316 into three parts 322, 324, 326. The parts 322, 324, 326 are joined by openings 328, 330 in the separators 318, 320 such that exhaust gases may flow into an inlet 338 (see also second conduit 332) of the muffler 310, into the first part 322, through the opening 328 in the first separator 318, through the second part 324, through the opening 330 in the second separator 320, through the third part 326, and out via an outlet 334. The path of the exhaust gases through the muffler 310 may facilitate cooling of the exhaust gases and mitigation of engine noise.

The muffler 310 further includes a first conduit 336 extending from a side of the muffler 310, through the chamber 316 of the muffler 310, and to a second conduit 332 (integral with the inlet 338). The first conduit 336 extends substantially in a straight line from the side of the muffler 310, to the second conduit 332. According to an exemplary embodiment, the first conduit 336 is held in place by the second shell 314, and held fixed by the first separator 318 and the first shell 312. In some embodiments, the first conduit 336 is constantly or periodically open to the atmosphere on one end 340 thereof. While in other embodiments, one or more pumps and/or valves are connected to the end 340 of the first conduit 336, which direct or facilitate air therethrough. The first conduit 336 then terminates in a connector 342 (e.g., seat, saddle, support, coupling) coupled to the second conduit 332 on the other end 344 thereof.

Figure 12:
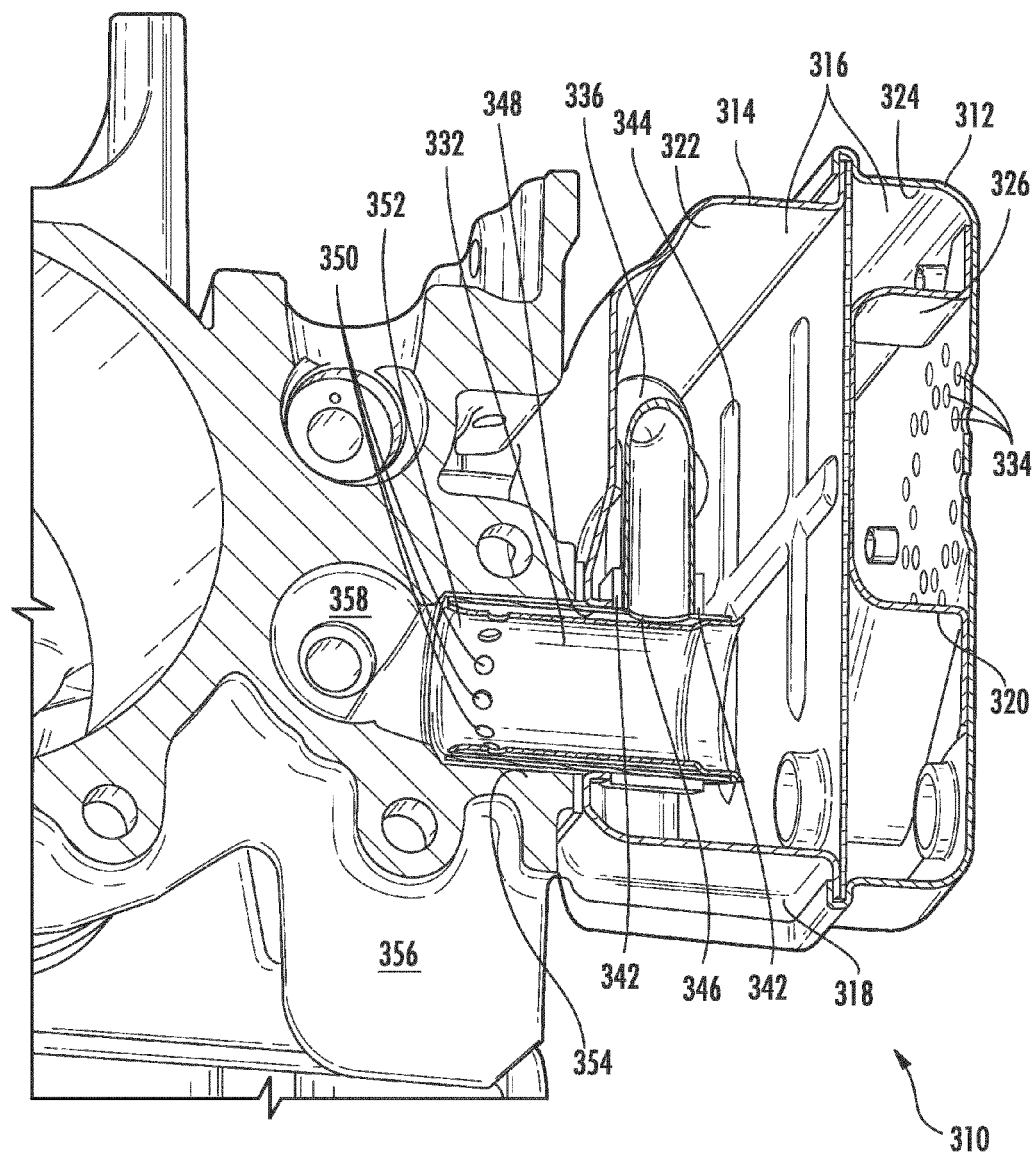
FIG. 12 is a sectional view of the muffler of FIG. 11 coupled to an engine according to an exemplary embodiment of the invention.

Referring now to FIG. 12, the connector 342 holds the first conduit 336 to an opening 346 in a side of the second conduit 332. The opening 346 leads to an open space 348 in the walls of the second conduit 332. The walls of the second conduit 332 further include a plurality of holes 350 proximate to the end 352 of the second conduit 332 configured to be inserted into an exhaust duct 354 of an engine block 356. Exhaust gases flow though the second conduit 332 past the plurality of holes 350, producing a low pressure that draws fresh air into the first conduit 336 from outside of the engine. In other embodiments, the fresh air is actively pumped or blown into the conduit (see generally FIGS. 19-22).

During operation of the engine, the fresh air is drawn or pumped through the first conduit 336, and into the walls of the second conduit 332, during which time the fresh air is continuously heated by exhaust gases that are passing through the second conduit 332 and into the chamber 316 of the muffler 310. The fresh air is introduced to the exhaust gases proximate to an exhaust valve seat 358, where hydrocarbons, carbon monoxide, and other pollutants in the exhaust gases are further combusted.

Referring to FIGS. 13-18, a muffler 510 includes a housing 512 forming an outer shell thereof. Within the housing 512, the muffler 510 includes one or more chambers 514 (FIGS. 17-18) for cooling exhaust gases and dampening noise of the engine. The housing 512 further includes fastener holes 522 and an inlet structure 516 (FIG. 15). The inlet structure 516 is designed to be coupled to an exhaust port of an engine, such as on the cylinder block or cylinder head of the engine (see, e.g., engine block 260 of FIG. 9). Opposite to the inlet structure 516, the housing 512 includes an outlet structure 518, shown as an area including a plurality of perforations 520. Exhaust gases pass into the muffler 510 through the inlet structure 516, cool in the one or more chambers 514, and exit the muffler 510 through the outlet structure 518.

A conduit 524 extends into the muffler 510 through an opening in the housing 512 thereof. According to an exemplary embodiment, the conduit 524 is formed from a heat conductive material able to withstand high temperatures of the exhaust gases without significant impact from deformation, corrosion, thermal fatigue, and the like. As shown in FIGS. 17-18, the conduit 524 passes into the interior of the muffler 510, and includes curvature designed to increase the length of the conduit 524 extending within the muffler 510. The length of the conduit 524 extending within the muffler 510 is designed a function of expected engine operating speed, the cross-section of conduit (e.g., diameter), and other factors associated with a given engine, configuration, or application, such that the length is sufficient to raise the temperature of the fresh air to a desired temperature (e.g., by 10-degrees Fahrenheit, 20-degrees Fahrenheit) during normal operation thereof.

In some embodiments, the conduit 524 forms at least part of one or more circular loops 526 (e.g., spirals, round or arcuate portion; see FIGS. 17-18) within the interior of the muffler 510. According to an exemplary embodiment, the conduit 524 forms at least two full circular loops 526 within the interior of the muffler 510. The loops 526 are believed to be more efficient (e.g., provide less pressure loss associated with changes in fluid momentum) relative to other geometries, due to the curvature of the loops 526. However, in other embodiments, other geometries are used (see, e.g., conduits 230 and 336 as shown in FIGS. 5 and 11, respectively).

During operation of the engine, the housing 512 of the muffler serves as a heat sink, allowing heat from the exhaust gases to pass therethough and away from the engine. According to the embodiment shown in FIGS. 17-18, the conduit 524 forms the loops 526, which do not contact the housing 512 of the muffler 510. Positioning the loops 526 of the conduit 524 substantially away from contact with the housing 512 of the muffler 510 (e.g., a least a quarter inch away therefrom) is believed to increase the heat transfer to fresh air passing through the conduit 524 because the conduit 524 is exposed to generally hotter exhaust gases.

Figure 16:
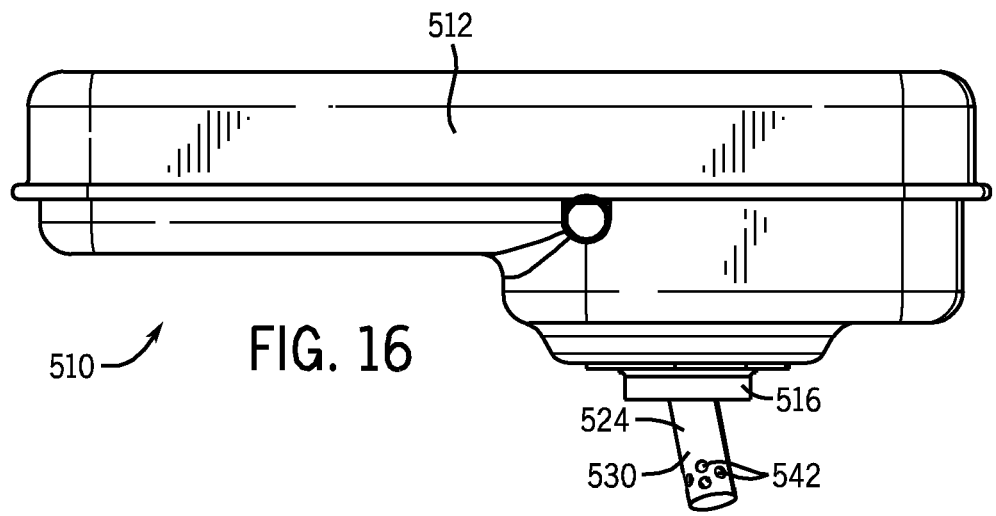
FIG. 16 is a side view of the muffler of FIG. 13.

Referring now to FIGS. 16 and 19-21, the conduit 524 includes an inlet 528 and an outlet 530. The inlet 528 (FIGS. 19-21) is designed to receive a flow of fresh air, which is directed through the conduit 524 and to the outlet 530 (FIG. 16). The fresh air is to be used for oxidation and/or secondary combustion of pollutants in the exhaust gases. In some embodiments, the fresh air is drawn into the conduit 524 by way of low pressure generated as the exhaust gases pass orthogonally by apertures 542 in the outlet 530 (FIG. 16). In other embodiments, the fresh air is actively pumped or blown into the inlet 528 of the conduit 524.

Referring to FIG. 19, a reed valve 610, or other directional-control or one-way valve, controls the flow of fresh air into the conduit 524. Pressure pulses of the engine, caused by the oscillating piston (see, e.g., piston 422 as shown in FIG. 22), actuate the reed valve 610, which only allows the fresh air to flow (into the conduit 524) when the pressure pulses produce a pressure lower than atmospheric pressure. According to an exemplary embodiment, the fresh air is filtered by an air filter 534 before entering the engine. The filter 534 may be positioned before or after the reed valve 610 along the flow path, but preferably before the reed valve 610. Additionally, one or more such filters may be used with other embodiments disclosed herein.

Figure 20:
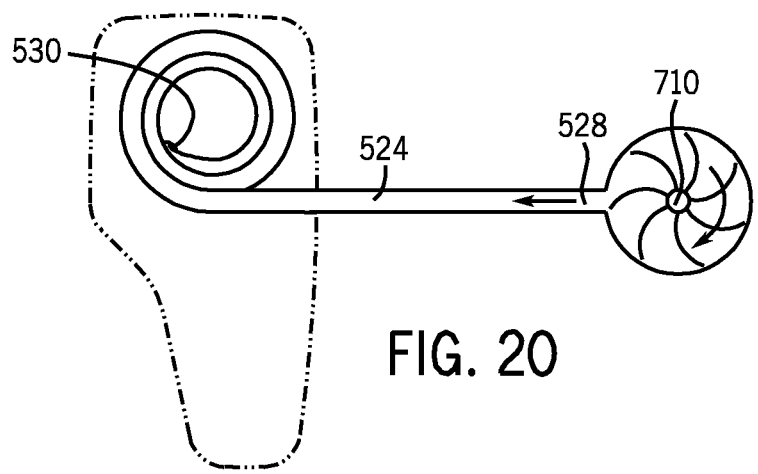
Figure 21:
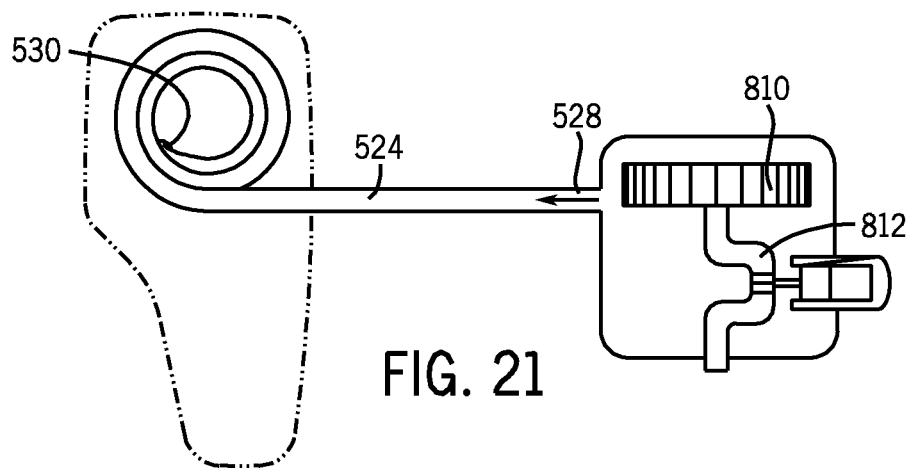

In some contemplated embodiments, a fan is used to blow fresh air into the conduit 524. Referring to FIG. 20, in some embodiments, an impeller 710 may be powered by the engine, such as by way of a belt or pulley system coupled to a crankshaft of the engine (see, e.g., crankshaft 434 as shown in FIG. 22). Referring to FIG. 21, fresh air may be driven into the conduit 524 by a blower 810 of the engine, where the blower 810 is coupled to a crankshaft 812, such as mounted to a flywheel of the crankshaft 812. The blower 810 may simultaneously be used for cooling the engine.

Referring to FIG. 22, an engine 410 includes a conduit 412 for receiving fresh air, which is coupled to a diaphragm pump 414. One or more check valves 416, 418 (e.g., reed valves) are positioned within the conduit 412 (e.g., on both sides of the diaphragm pump 414) for controlling a flow of fresh air through the conduit 412. The diaphragm pump 414 is coupled to an interior 420 of the engine 410 (e.g., crankcase, intake manifold, etc.) and is powered by pressure fluctuations in the engine 410, which are related to air displaced by a piston 422 of the engine 410. During operation of the engine 410, fresh air is drawn into the conduit 412 by the diaphragm pump 414, and driven through a muffler 424, where the air is heated via recovery of waste heat carried by exhaust gases of the engine 410. The (heated) fresh air is then introduced into the exhaust gases, proximate to an exhaust valve 426 of a combustion chamber 428 of the engine 410. In other embodiments, a piston pump is driven by the pressure fluctuations in the engine 410, and used to drive the fresh air through the conduit 412.

In other embodiments, a diaphragm pump is coupled to an air intake 430 of the engine 410, and the conduit 412 extends to and through the muffler 424, and into an exhaust duct 432. In still other embodiments, a mechanical piston pump may be coupled to a crankshaft 434 through intermediate gearing, pulleys, belts, etc. In still other embodiments an electric air pump may be coupled to the end 436 of the conduit 412, and powered by batteries or by an alternator driven by the crankshaft 434. In some embodiments, two or more pumps are used to drive the fresh air through the conduit 412. In contemplated embodiments, one or more check valves may be used in conjunction with a venturi arrangement, where a low pressure region proximate to an end 438 of the conduit 412 draws fresh air under atmospheric pressure into the conduit 412.

The construction and arrangements of the muffler and engine system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, some contemplated embodiments include mufflers having a housing formed from a single folded metal sheet, as opposed to from shells crimped together. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A muffler for exhaust gases of a combustion engine, comprising:
    walls forming a chamber through which the exhaust gases pass;
    a first inlet in the walls of the chamber configured to receive the exhaust gases from an exhaust duct of the engine;
    a first outlet in the walls of the chamber through which the exhaust gases exit the chamber;
    a conduit having a second inlet and a second outlet, the second inlet extending through the walls of the chamber, the conduit extending through the chamber, and the second outlet extending through the walls of the chamber into the first inlet;
    wherein, the second outlet of the conduit is located outside of the chamber.

2. The muffler of claim 1, wherein a portion of the conduit is positioned within the chamber such that heat is transferred through the conduit from the exhaust gases to the fresh air during operational use of the muffler.

3. The muffler of claim 2, wherein the portion of the conduit does not contact the walls.

4. The muffler of claim 3, wherein the first inlet comprises a tube that extends from the walls and is configured to be inserted into the exhaust duct of the engine.

5. The muffler of claim 4, wherein the conduit extends to the first inlet.

6. The muffler of claim 5, wherein the second outlet comprises a plurality of small openings configured to distribute the fresh air into the exhaust gases entering the first inlet.

7. The muffler of claim 6, wherein the conduit extends through the tube of the first inlet.

8. The muffler of claim 7, wherein the second outlet extends further from the walls than the tube of the first inlet.

9. The muffler of claim 8, wherein the conduit is a pipe, and wherein the second inlet is a first end of the pipe, and the second outlet comprises a second end of the pipe that has been pinched closed, and wherein the plurality of small openings are proximate to the second end.

10. The muffler of claim 9, wherein the walls form sides of the muffler, and wherein the first outlet and the second inlet are on different sides of the muffler.

11. A muffler for exhaust gases of a combustion engine, comprising:
    walls forming a chamber through which the exhaust gases pass;
    a first inlet in the walls of the chamber configured to receive the exhaust gases from an exhaust duct of the engine;
    a first outlet in the walls of the chamber through which the exhaust gases exit the chamber;
    a second inlet configured to receive fresh air entering the muffler;
    a second outlet configured to introduce the fresh air into the exhaust gases; and
    a conduit extending between the second inlet and the second outlet,
    the second inlet extending through the walls of the chamber, the conduit extending through the chamber such that heat is transferred from the exhaust gases to the fresh air during operational use of the muffler, and the second outlet extending through the walls of the chamber into the first inlet;
    wherein, the second outlet of the conduit is located outside of the chamber.

12. The muffler of claim 11, wherein the first inlet comprises a tube extending from the walls, and wherein the second outlet extends further from the walls than the tube of the first inlet.

13. The muffler of claim 12, wherein the second outlet comprises a plurality of small openings configured to distribute the fresh air in the exhaust gases entering the first inlet.

14. The muffler of claim 13, wherein the second inlet is an open end of the conduit that is at least one of open to the atmosphere, coupled to a fan, coupled to a pump, and connected to a valve.

15. The muffler of claim 14, wherein the conduit comprises a second end that has been pinched closed, and wherein the plurality of small openings are proximate to the second end.

16. The muffler of claim 1, wherein the conduit forms a loop within the chamber.

17. The muffler of claim 1, wherein a substantial length of the conduit is positioned within the chamber.

18. The muffler of claim 11, wherein the portion of the conduit includes a loop.

19. The muffler of claim 11, wherein the portion of the conduit is a substantial length of the conduit.

20. The muffler of claim 11, wherein a second portion of the conduit extends between the second inlet and the chamber and a length of the second portion is less than a length of the portion of the conduit positioned within the chamber.

\* \* \* \* \*